Aug. 2, 1960 R. C. ABBOTT 2,947,858

APPARATUS FOR DETERMINING THE LISTENING HABITS OF WAVE SIGNAL RECEIVER USERS

Filed July 28, 1958 2 Sheets-Sheet 1

INVENTOR.
Robert C. Abbott
BY D. Emmett Thompson
Attorney

Aug. 2, 1960 R. C. ABBOTT 2,947,858

APPARATUS FOR DETERMINING THE LISTENING HABITS OF WAVE SIGNAL RECEIVER USERS

Filed July 28, 1958 2 Sheets-Sheet 2

INVENTOR.

Robert C. Abbott

BY D. Emmett Thompson

Attorney

United States Patent Office 2,947,858
Patented Aug. 2, 1960

2,947,858

APPARATUS FOR DETERMINING THE LISTENING HABITS OF WAVE SIGNAL RECEIVER USERS

Robert C. Abbott, 1032 Wadsworth St., Syracuse 8, N.Y.

Filed July 28, 1958, Ser. No. 751,367
2 Claims. (Cl. 250—2)

Prior to this time two principal methods have been used to determine the listening habits of wave signal receivers such as AM or FM radio receivers, television receivers and the like.

The first such method is to install on the receivers in a number of users' homes apparatus for recording on a tape or the like the programs to which the receiver is tuned over a period of time. These receiver users known as "collaborators" are selected on a statistical basis to include variants such as economic position, religion, ethnic origin, etc., whereby a sampling based on the listening habits of the collaborators is extrapolated to give an indication of the listening habits of a very large proportion of the population. This method has the defects that it is necessary periodically to visit the collaborators' homes to remove the recorder graphs or charts from the receivers and install new charts. The removed charts are then taken to a central station where a statistical analysis is taken from the results of the charts to give a determination of the portion or total number of the population which were listening to certain programs at certain times, this information being highly advantageous to the commercial sponsors of entertainment programs presented on radio or television. The results determined by this method are not reliable because of the necessarily small sample taken and this method has the defect that it also takes a great deal of time to determine these results. Further, it is necessary with this method to enter the collaborators' homes periodically to collect the data recorded on the receiver attachments which necessitates the further cooperation of the collaborators. Finally, this method is disadvantageous because these receiver attachments are costly to manufacture and install.

The second method of determining wave signal receiver listening habits in use prior to this time, is that of selecting collaborating homes on a basis similar to that set forth in the first method, and periodically calling each of these collaborating homes by telephone to determine the programs to which the receivers in the collaborating homes are tuned at the time of the call. As in the first method, this data is then statistically analyzed to give results similar to those of the first method. This second method has the defects that it requires the cooperation of the collaborators and also takes time to determine the results, it being necessary to collect the data and compile it in a manner similar to that of the first method, and such results are also unreliable for the reasons set forth in connection with the description of the first method.

Both of the first and second methods above described have the further defect that the collaborating wave signal receiver users oftentimes inadvertently permit their listening habits to be influenced by the knowledge of the fact that their listening habits are to be analyzed, thus causing both of the systems, or methods, to be further unreliable.

This invention relates to and has as an object a completely passive method and apparatus for determining the listening habits of wave signal receiver users.

More specifically, this invention has as an object a method and apparatus for determining the listening habits of wave signal receiver users without the knowledge or collaboration of the users.

A further object of this invention is to provide a method and apparatus for determining the listening habits of wave signal receiver users which utilizes the only thing common to said receivers, this being a power distribution system to which the receivers are connected.

In the drawings—

It has been found that wave signal receivers such as television receivers and the like experience a uniform change in power consumption if the wave signal to which a typical receiver is tuned is sufficiently changed in strength. That is to say, in the case of television receivers for example, if the transmitted signal wave is increased in strength there is a resultant decrease in power consumption in the wave signal receiver, and conversely if the transmitted wave signal strength is decreased there is an increase in power consumption to the receiver. This phenomenon is primarily due to the well known AVC (automatic volume control) or AGC (automatic gain control) circuit. In a typical wave receiver a sufficient change in strength of the received wave signal results in a change in the D.C. voltage applied to the control grid of one or more of the amplifier tubes in the wave receiver. This change in the D.C. voltage changes the power consumed by the affected amplifier tube or tubes, and this power change is evidenced by a corresponding change in the power demanded by the wave signal receiver from the power source.

Briefly described, this invention comprises the method and apparatus for causing a momentary change in strength of the transmitted wave signal, this change causing a corresponding change in the power consumption of the wave signal receivers tuned to the transmitted signal; measuring the total change in power level at a power distribution substation serving a link or web of homes or the like in which the wave signal receivers are located; and determining from the change in power level the total number of wave signal receivers in the link or web serviced by the power distribution substation, which are tuned to the wave signal transmitted.

Figure 1:
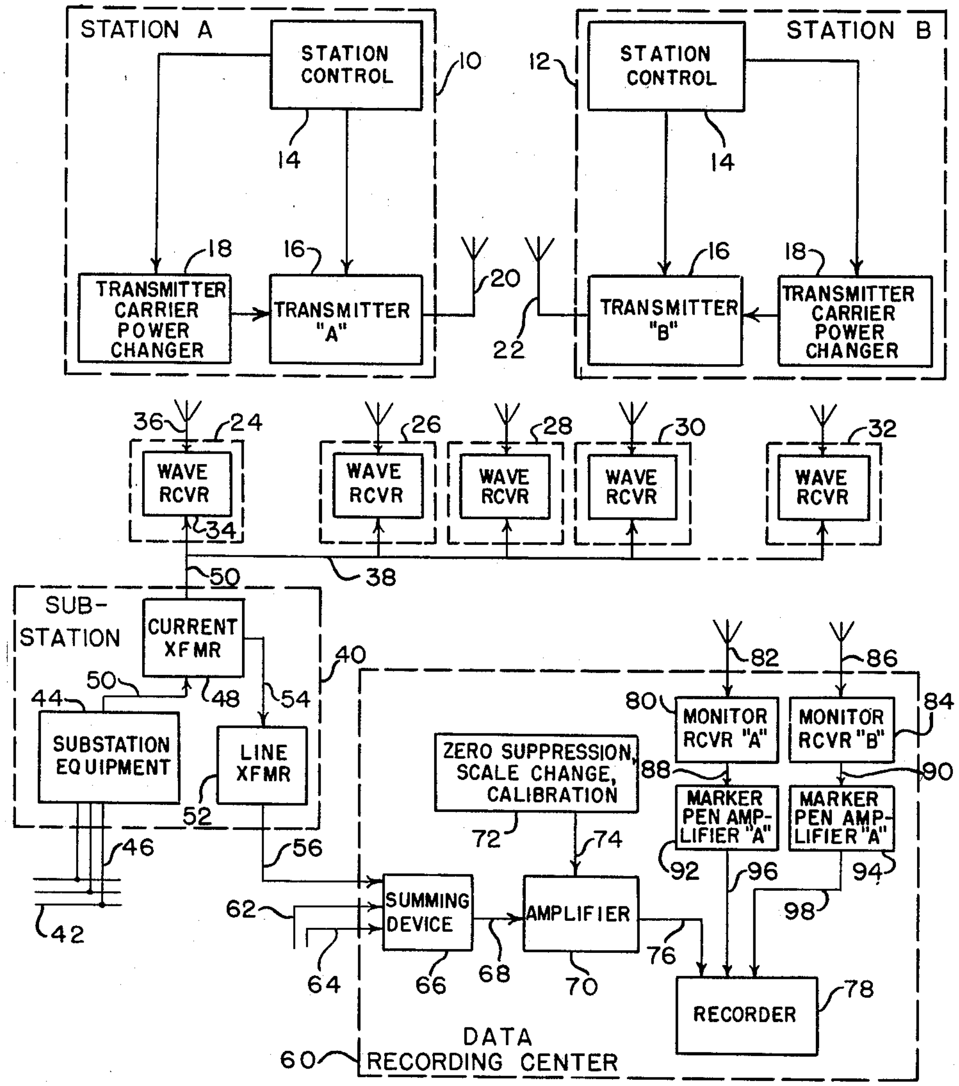
Figure 1 is a schematic or block diagram of the invention as used in a local operation.

In Figure 1 the invention is shown in use in a local operation, that is to say within one geographic area such as a city or town served by one or more wave signal transmitter. Dash lines 10 and 12 represent two radio or television stations, or the like called for purposes of description station A and station B, respectively. Each of the stations includes the standard station control apparatus 14, a transmitter 16 and a transmitter carrier power changer 18.

The transmitter carrier power changer may comprise any apparatus suitable for momentarily changing or varying the strength of the signal to be transmitted by the transmitter 16 and has been shown diagrammatically in Figure 1 in block form as being connected between the station control apparatus and the transmitter.

Station A includes a radiating signal antenna 20 and station B has a similar antenna 22.

The dash lines 24, 26, 28, 30 and 32 represent a plurality of homes located within the receiving area of stations A and B, and each of the homes 24 to 32 include a wave signal receiver 34 having an aerial 36 to receive the signal transmitted from the stations A and B. Each of the homes 24 to 32 are located in a link, web, or system serviced by a common secondary power distribution line 38 emanating from a power substation indicated by dash lines at 40.

The substation 40 may be a pole transformer servicing a small number of homes, or may be a large power substation servicing a large number of homes. The substation 40 is furnished with power indicated by the lines 42 which passes through conventional substation equipment indicated at 44 via the lines 46. A current transformer 48 is positioned across the line 50 which connects the substation with the distribution line 38 to continuously measure in terms of a voltage indication the current value of the substation distribution system.

A line transformer 52 is connected by means of the line 54 to the current transformer 48 and a leased telephone line or the like 56 connects the transformer 52 to a data recording center indicated by the dash lines 60. Lines 62 and 64 indicate phone lines entering the data recording center 60 from other substations. The voltage indication transmitted to the recording center by the leased phone lines or the like 56, 62 and 64 is rectified and totaled in a conventional rectifying and summing device indicated at 66 to give a voltage proportional to total power consumption in all of the substations connected to lines 56, 62 and 64, and the device 66 is connected by means of a line 68 to an amplifier 70 where the summed voltage indication is amplified. The amplifier 70 is connected to a zero suppression calibration and scale change device 72 such as are well known in the art by means of the line 74 whereby variations in the summed voltage indications transmitted to the recording center from each of the substations are plotted via line 76 on an expanded calibrated scale on recorder 78.

The recording center 60 includes a monitor receiver 80 having an antenna 82 for station A, and a similar monitor receiver 84 having an antenna 86 for station B. The monitor receivers 80 and 84 are connected by the lines 88 and 90 to conventional marker pin amplifiers, 92 for station A, and 94 for station B, the amplifier A being connected by the line 96 to the recorder78 and the amplifier 94 being connected by the lines 98 to the recorder 78.

The operation of the invention illustrated in Figure 1 is as follows: When it is desired to determine the number of wave signal receivers tuned to station A, for example, the transmitted carrier power changer 18 of station A is actuated to cause a momentary change in the power of the transmitter 16 in station A so as to change the signal strength radiated by the antenna 20. Due to the phenomenon hereinbefore described, the wave signal receivers 24 to 32 which are tuned to station A at the time the signal strength is sufficiently changed will experience a corresponding uniform change in power consumption. By means of the current transformer 48 placed across the distribution and feed lines 50 and 38, the total change in power consumption of the link or web of homes serviced by the substation 40 will be measured as a voltage indication by the current transformer 48. This indication will by means of the line 54, transformer 52, and line 56 be transmitted to the rectifying and summing device 66. Concurrently, other indications will be transmitted to the rectifying and summing device 66 from other similar substations serving homes in the signal receiving area of station A by the line 62 and 64. By means of the zero suppression calibration and scale change device 72 and the amplifier 70, a voltage indication variation proportional to the total number of wave signal receivers tuned to station A at the time the signal strength is changed will be marked on an expanded calibrated scale on the recorder 78. Simultaneously therewith, by means of the monitor reeciver 80 and the marker pen amplifier 92, an indication will register via the line 96 on the recorder 78 to indicate on the recorder the precise time at which the strength of the transmitted signal from station A was changed, which indication will correspond to the indication marked on the recorder 78 through the line 76 whereby an operator may readily determine that the indication inscribed on the recorder 78 through the line 76 was due to the change in power consumption of the wave signal receivers tuned to station A and not due to any other variation in power consumption from other causes.

In like manner when the transmitted signal strength of station B is changed the change will be registered via the line 76 on the recorder 78 and the monitor 84 and marker pen amplifier 94 will via the line 98 mark the recorder 78 to indicate to the operator that the change marked on the recorder 78 by the line 76 was due to a change in signal strength of station B.

Figure 2:
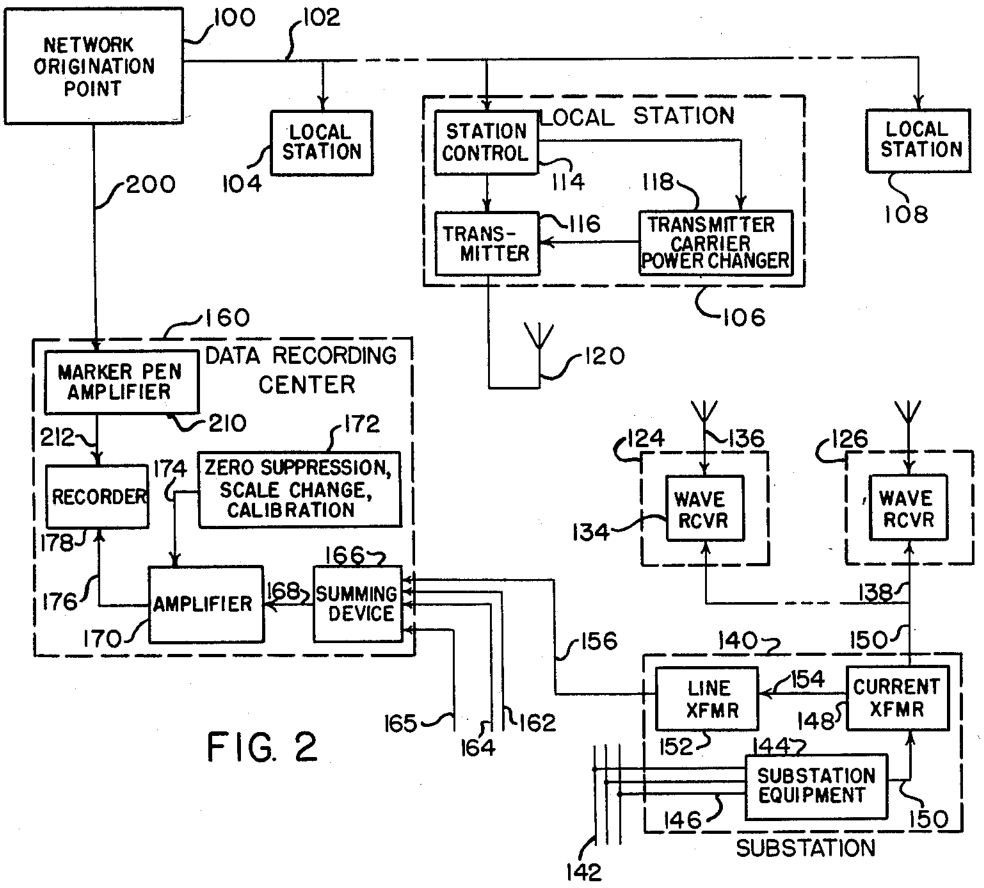
Figure 2 is a schematic or block diagram showing the invention as used in a national or network operation.

Figure 2 illustrates a network or national operation utilizing the method and apparatus of my invention. In that figure the block 100 indicates the network origination point, and the line 102 indicates the means for transmitting the program originating at 100 to the local stations indicated at 104, 106 and 108. As will be obvious, the line 102 may indicate either a micro-wave transmission system or a coaxial cable transmission system.

Station 106 is similar to the stations 10 and 12 as described in connection with Figure 1 and includes the conventional station control apparatus 114, a transmitter 116 and a transmitter carrier power changer 118, the transmitter 116 including the signal radiating antenna 120.

The dash lines 124 and 126 indicate homes within the receiving area of the station at 106, the homes 124 and 126 having wave signal receivers 134 including receiving antenna 136 therein. The homes 124 and 126 are serviced by a power distribution line 138 emanating from a power substation 140 similar to that described in connection with Figure 1. The power substation 140 includes the power lines 142 connected to the conventional substation equipment 144 by the lines 146. A current transformer 148 is connected across the line 150 which distributes the power to the feeder lines 138. The current transformer 148 is connected by lines 154 to a line transformer 152 connected by a line 156 to a data recording center 160 similar to the data recording center 60 described in connection with Figure 1. The line 156 is connected to a rectifying and summing device 166, similar to that described in connection with Figure 1, and located in the data recording center 160; and similar lines 162, 164 and 165 connect other substations similar to 140 to the device 166. The device 166 is connected by line 168 to an amplifier 170 connected to a zero suppression calibration and scale change device 172 by means of the line 174, the amplifier 170 being connected by means of the line 176 to a recorder 178.

The network origination point is connected by means of a line 200 to a marker pen amplifier 210 similar to the marker pen amplifier 92 and 94, described in connection with Figure 1, and the marker pen amplifier 210 is connected by the line 212 to recorder 178.

The network operation illustrated in Figure 2 operates in a manner similar to that described in connection with Figure 1. In the operation of the invention as applied to a network system, however, the transmitter carrier power changer may, if desired, be controlled by any suitable means from the network origination point so as to change the signal strength of the local transmitter 116. Thereafter in a manner similar to the operation described in connection with Figure 1, this change is recorded as a voltage variation on the recorder 178 and the marker pen amplifier 210 connected by the line 200 to the network origination point 100 is connected to the recorder 178 by the line 212 to indicate on the recorder 178 the time when the sampling is taken, the marking of the recorder 178 by the marker pen amplifier 210 corresponding to the mark caused by the line 176 on the recorder 178 thereby giving to the central data recording center 160 a voltage indication proportional to the total number of sets tuned to the program originating from the network point 100.

As will be obvious the lines 156, 162, 164 and 165 may connect to the rectifying and summing device 166 a plurality of substations located throughout an entire geographic area such as a country having receivers within the receiving area of the local stations located throughout the country such as 104, 106 and 108 which are transmitting the network programs originating from the point 100. Further, or in the alternative, the values indicated at the substation 140 may be summed for an entire city and a total value for each city then transmitted via lines similar to 156 to a central data recording center 160 whereby the wave signal receiver users tuned to the program originating from the point 100 for an entire city may be individually determined.

Figure 3:
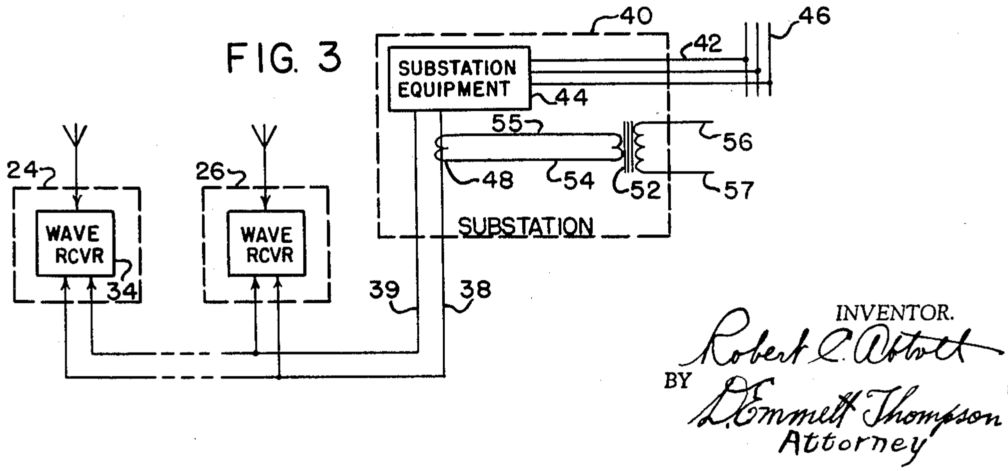
Figure 3 is a schematic diagram of a portion of the invention.

Figure 3 illustrates in detail the manner of measuring the power change in a power distribution web or link serviced by a substation 40. The lines 42 connect the convention substation equipment 44 to the power lines 46 and the individual homes 24 and 26 having wave signal receivers 34 located therein are connected by means of the secondary power distribution lines 38 and 39 to the substation 40. The power consumption of the homes 24 and 26 serviced by the secondary distribution lines 38 and 39 is continuously measured by the current transformer 48 connected to the line transformer 52 by means of the lines 54 and 55, the line transformer 52 being in turn connected by means of the lines 56 and 57 to a rectifying and summing device 66 located in the data recording center 60 as shown in Figure 1. As will be obvious the current transformer in the substation 40 continually measures in terms of voltage the secondary distribution current in the lines 38 and 39, and the line transformer 52 steps up a voltage indication given by the current transformer 48 via the lines 54 and 55 for transmission over the lines 56 and 57 to the rectifying and summing device 66. The lines 56 and 57 may be leased telephone lines, or any other suitable means of transmitting the stepped-up voltage indication of the current transformer 48.

The device 66 rectifies and sums the voltage indication proportional to the power consumption in each of a plurality of substations 40 and this summed voltage is fed to the amplifier 70. This amplified summed voltage is fed by the lines 76 to the recorder 78 whereby the device 72 the zero value of voltage is suppressed and voltage values are plotted on an expanded calibrated scale to give a voltage indication proportional to the total number of wave signal receivers.

To distinguish the voltage variations caused by a change in the transmitted signal strength from ordinary variations plotted on the recorder 78 the monitors 80 and 84, through the marker pen amplifiers 92 and 94 cause the recorder to be marked at the time the transmitted signal strength is changed whereby the voltage variation indicated on the recorder 78 attributable to such signal strength change may be readily determined.

As will be obvious an observer in the data recording center may, by determining the amplitude of the voltage variation due to the change in transmitted signal strength, readily determine from the known uniform change in power consumption per individual signal receiver the total number of receivers tuned to the transmitted signal.

With my invention the sampling taken may be very large and may be almost instantaneously interpreted. Further, my invention requires no cooperation whatsoever from the individual wave signal receiver users, it being only necessary to measure power consumption variations at the proper point in the power distribution system.

What I claim is:

1. A system for determining the total number of wave signal receivers tuned to a transmitted wave signal comprising a wave signal transmitter, means for momentarily varying the strength of the wave signal transmitted by said transmitter, said strength variation being of sufficient magnitude to induce a uniform change in power consumption of the wave signal receivers tuned to said signal, means for measuring the total change in power consumption in each of a plurality of power distribution systems common to said receivers tuned to said signal, the total change in power consumption of said systems being proportional to the total number of wave signal receivers tuned to said transmitted signal.

2. In a system of the character described the combination of: a wave signal transmitter, means for momentarily changing the power of the signal transmitted by said transmitter, a plurality of wave signal receivers tunable to said transmitter, said receivers being supplied with operating power from a common power distribution link, and means for measuring the change in power consumption in said link due to the uniform change in power consumption of said receivers tuned to said transmitter when the power of said transmitter is changed, whereby the number of said receivers tuned to said transmitter may be determined.

References Cited in the file of this patent

UNITED STATES PATENTS 2,558,754 Horn et al. -------------- July 2, 1951